United States Patent [19]

Brickner et al.

[11] Patent Number: 5,347,902
[45] Date of Patent: Sep. 20, 1994

[54] MOTORIZED MITER BOX

[75] Inventors: Louis C. Brickner, Pittsburgh; Jaime E. Garcia, Wexford, both of Pa.

[73] Assignee: Delta International Machinery Corp., Pittsburgh, Pa.

[21] Appl. No.: 44,545

[22] Filed: Apr. 7, 1993

Related U.S. Application Data

[63] Continuation of Ser. No. 854,381, Mar. 25, 1992, abandoned.

[51] Int. Cl.⁵ ............................................. B26D 1/16
[52] U.S. Cl. ................................ 83/468.3; 83/471.3; 83/490; 83/581
[58] Field of Search ............... 30/519; 93/468.3, 471.3, 93/473, 581, 490

[56] References Cited

U.S. PATENT DOCUMENTS

| | | | |
|---|---|---|---|
| 135,628 | 2/1873 | Clemson | 30/519 |
| 155,950 | 10/1874 | Howson | 30/519 |
| 1,151,078 | 8/1915 | Young | 30/519 |
| 1,531,131 | 3/1925 | Price | 30/519 |
| 1,590,557 | 6/1926 | Semelroth | 30/519 X |
| 4,365,531 | 12/1982 | Potrin | 83/766 X |
| 4,694,720 | 9/1987 | Brickner, Jr. et al. | 83/471.3 |
| 5,038,650 | 8/1991 | Hodge | 83/471.3 |

*Primary Examiner*—Richard K. Seidel
*Assistant Examiner*—Kenneth E. Peterson
*Attorney, Agent, or Firm*—Merchant, Gould, Smith, Edell, Welter & Schmidt

[57] ABSTRACT

A motorized miter box or saw comprising a cuttinghead handle for guiding the movement of the saw between a raised, rest position and a lowered, operational position. The cuttinghead handle is adjustably coupled to the cuttinghead so that the orientation of the cuttinghead handle with respect to a user of the saw can be adjusted by the user between a first position and a second position. The first position has a preferred orientation for the user when the saw is located on a floor or at a similar elevation and the user is kneeling or similarly located at floor level. The second position has a preferred orientation for the user when the saw is located on a bench or similar elevated structure and the user is standing or similarly located in front of the saw.

The disclosed motorized miter box also comprises a carrying handle for use by a user in carrying the miter box between work sites. The carrying handle protrudes from the rear of the miter box base. The carrying handle comprises a support surface located in the same geometric plane as the lower surface of the base so that the carrying handle helps prevent the miter box saw from tipping backwards if the cuttinghead apparatus is allowed to move freely from its lowered, operational position to its upper, at rest position.

22 Claims, 6 Drawing Sheets

MOTORIZED MITER BOX

This is a continuation of application Ser. No. 07/854,381, filed Mar. 25, 1992, now abandoned.

BACKGROUND AND SUMMARY OF THE INVENTION

The present application relates to motorized miter boxes or the like and, more particularly, to improvements in the handles for such saws.

The handle improvements are embodied in a motorized miter box comprising a base having a lower surface for supporting the base on a work surface. A turntable is rotatably supported by the base, and a fence is disposed above the worktable for supporting the orientation of a workpiece located on the base. A support is coupled to the turntable at a rear portion of the turntable.

The motorized miter box disclosed also includes cuttinghead apparatus comprising a motor driving a saw blade for cutting the workpiece. The cuttinghead apparatus is pivotally coupled to the support for positioning a motor driven saw between a raised, rest position and a lowered, operational position. The cuttinghead apparatus comprises biasing apparatus for biasing the motor driven saw to the raised, rest position.

The cuttinghead handle comprises a cuttinghead handle having a switch electrically coupled to the motor, the cuttinghead handle for guiding the movement of the saw between the raised, rest position and the lowered, operational position. The cuttinghead handle is adjustably coupled to the cuttinghead apparatus so that the orientation of the cuttinghead handle with respect to a user of the saw can be adjusted by the user between a first position and a second position.

The carrying handle comprises a carrying handle for use by a user in carrying the miter box between work sites. The carrying handle protrudes from the rear of the base. The carrying handle comprises a support surface located in the same geometric plane as the lower surface of the base so that the carrying handle helps prevent the miter box from tipping backwards if the cuttinghead apparatus is allowed to move freely from its lowered, operational position to its upper, at rest position.

BRIEF DESCRIPTION OF THE DRAWINGS

In FIG. 5, the cuttinghead handle is shown in a first position having a preferred orientation for the user when the saw is located on a floor or at a similar elevation and the user is kneeling or similarly located at floor level. FIG. 6 illustrates the cuttinghead handle in a second position having a preferred orientation for the user when the saw is located on a bench or similar elevated structure and the user is standing or similarly located in front of the saw.

DESCRIPTION OF THE PREFERRED EMBODIMENT

Figure 1:
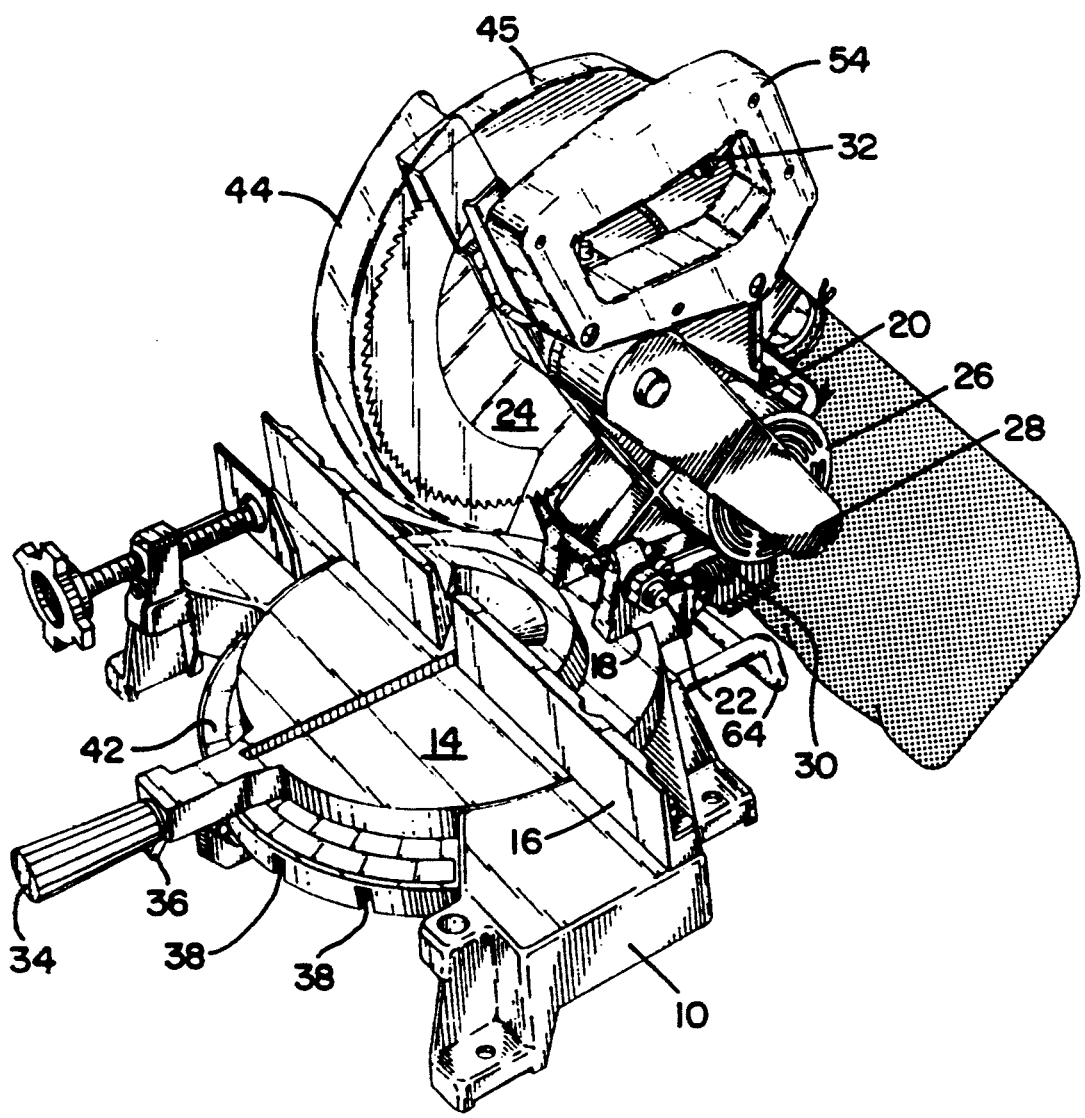
FIG. 1 illustrates a top, front and right side perspective of a motorized miter box.
Figure 2:
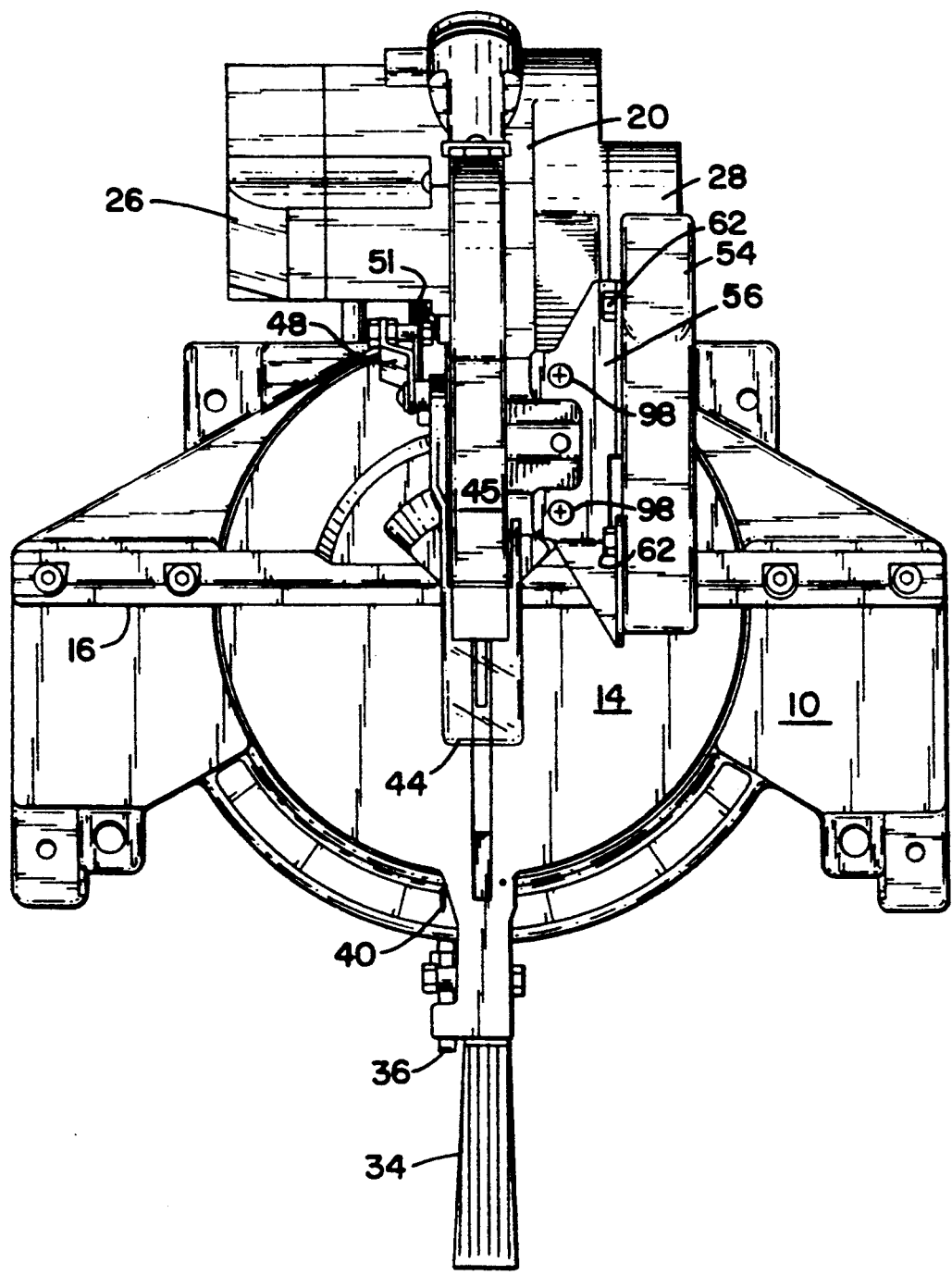
FIG. 2 illustrates a top, plan view of a motorized miter box.
Figure 3:
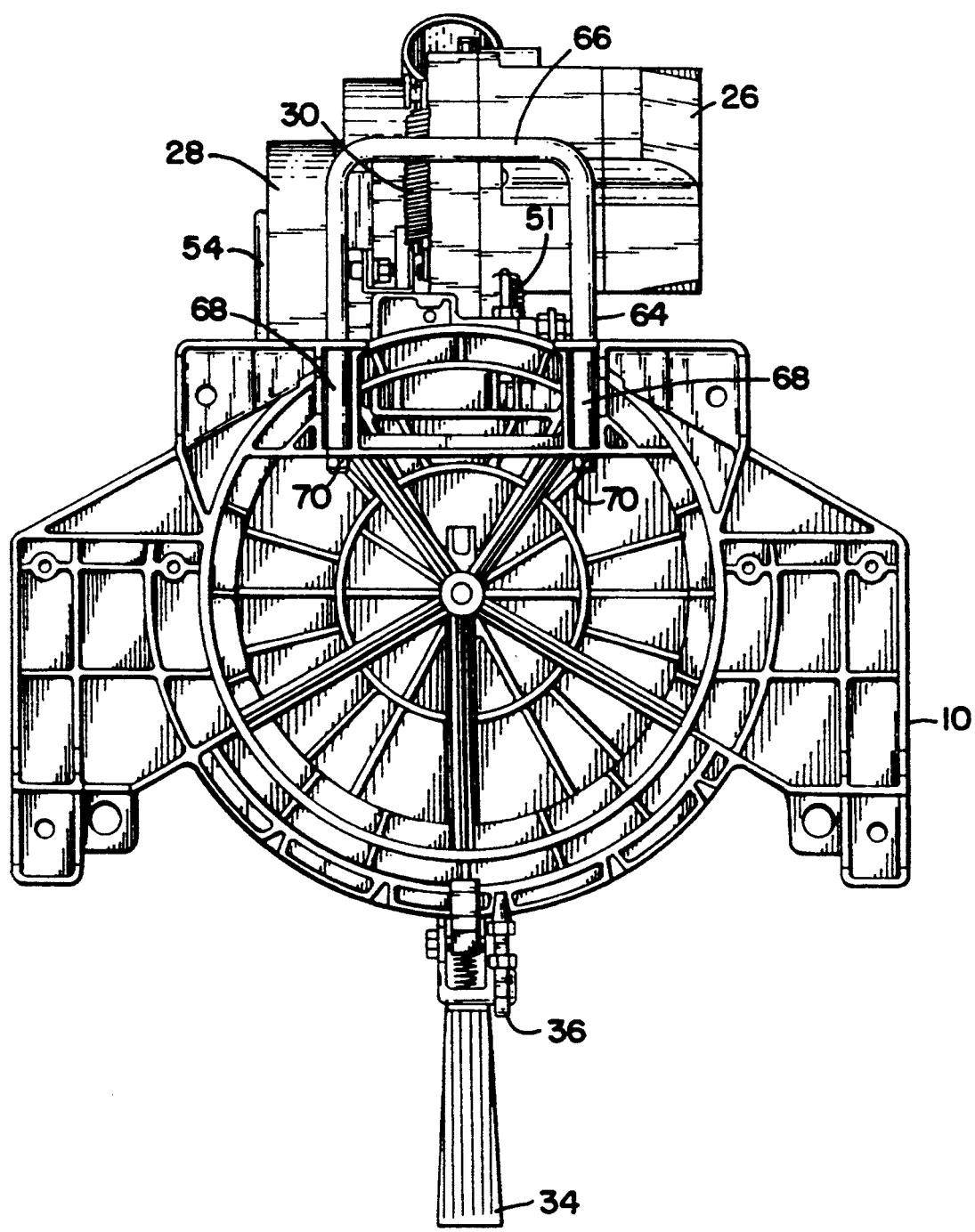
FIG. 3 illustrates a bottom plan view of a motorized miter box.
Figure 4:
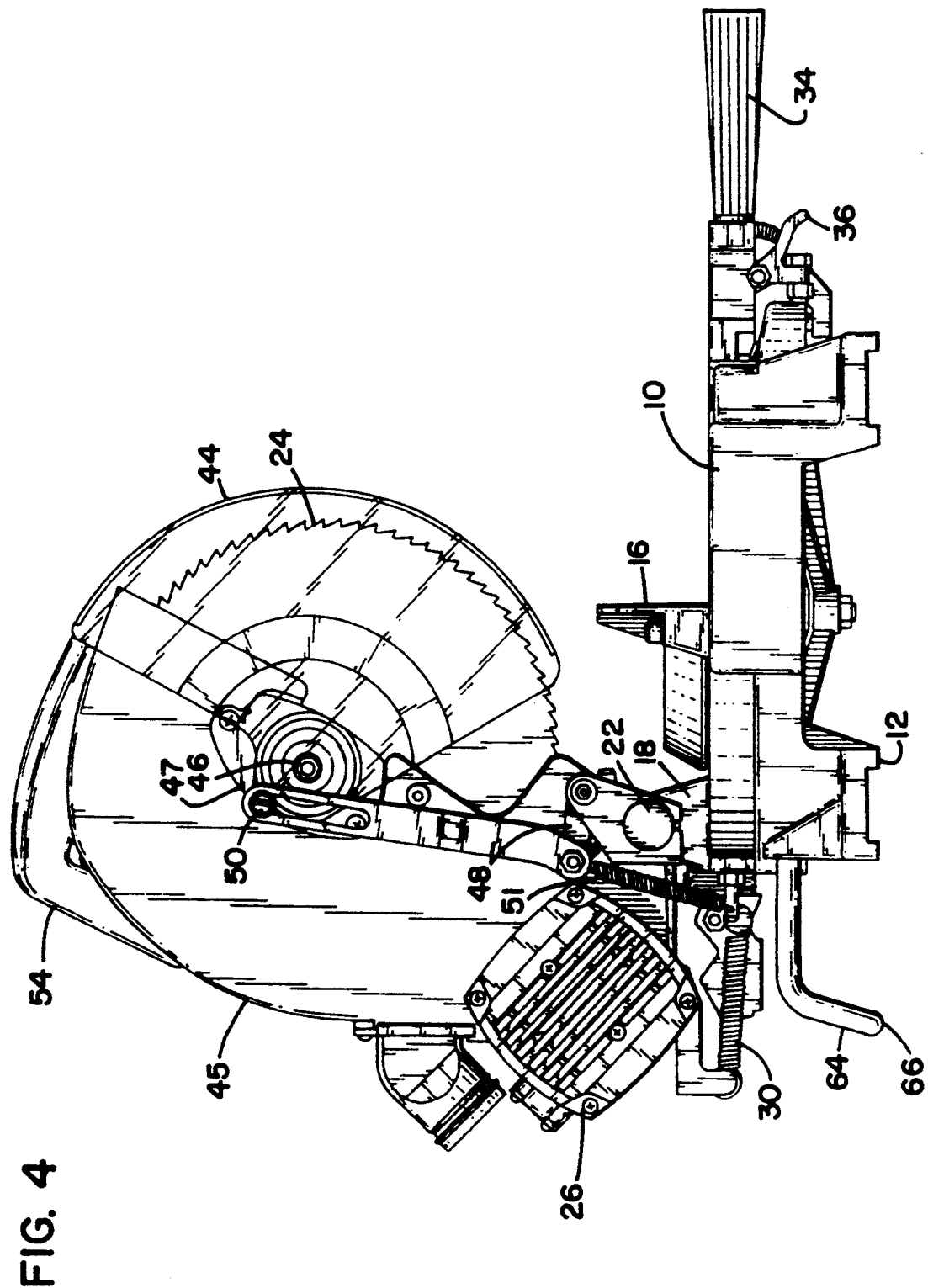
FIG. 4 illustrates a left side elevational view of a motorized miter box.

The motorized miter box illustrated in the drawings comprises a base 10 having a lower surface 12 for supporting the base on a work surface. A turntable 14 is rotatably supported by base 12. A fence 16 is disposed above base 10 for supporting the orientation of a workpiece located on the base. A support 18 is coupled by conventional means to turntable 14 at a rear portion of the turntable.

The miter box shown further comprises cuttinghead apparatus for cutting the workpiece. The cuttinghead apparatus may comprise an arm 20 coupled to support 18 by a pivot bolt 22 for positioning a motor driven saw 24 between a raised, rest position and a lowered, operational position.

In the embodiment disclosed, a motor 26 drives saw 24 through a drive belt and pulley system enclosed in part by belt housing 28. In the preferred embodiment, motor 26 is a 22,000 rpm universal type motor, and the pulleys are sized to run the blade at a no-load speed of approximately 6000 rpm. The drive belt (not shown) may comprise a poly v-belt. Saw 24 is energized by depressing switch trigger 32 and stopped by releasing switch trigger 32, which is electrically coupled to motor 26. The cuttinghead apparatus comprises a biasing spring 30 for biasing motor driven saw 24 to the raised, rest position.

In its preferred configuration, the miter box will cut any angle from a straight 90 degree cut to 47 degrees right and left. To adjust the angle of cut, lock handle 34 is loosened and plunger trigger 36 is pulled upward, enabling the turntable to be set at any angle by tightening lock handle 34. The miter box shown is equipped with positive stops 38 at the zero, 22½, and 45 degrees right and left positions. In order to employ these positive stops, lock handle 34 is loosened and moved either right or left as desired until plunger trigger 36 engages into one of the positive stops. A pointer 40 and scale 42 (numbers not shown) are used to locate angles of cut in between positive stops 38.

Saw 24 is protected by both a fixed-position upper blade guard 45 and a movable lower blade guard 44. When a cut is made in stock, lower blade guard 44 automatically moves upward in order to expose blade 24 to the stock. Lower blade guard 44 rotates about pivot 46 located on a pivot plate 47 mounted to upper blade guard 45. Lower blade guard 44 is activated by linkage bars 48 coupled between support 18 and a pivot 50 eccentrically located on lower blade guard 44. Linkage bars 48 and spring 51 keep lower blade guard 44 biased in position to cover saw 24 whenever the saw is in its raised, rest position. In the preferred embodiment, saw 24 is 10 inches (254 millimeters) in diameter, and all other parts of the preferred embodiment are shown to scale in the drawings.

Those skilled in the art will recognize that many configurations of motorized miter boxes including changes to base 10, turntable 14, motor drive arrangements, guard arrangements, linkage arrangements, dimensions, and the like may be used and that those shown in the drawings and explained above are set forth by way of example only.

Figure 5:
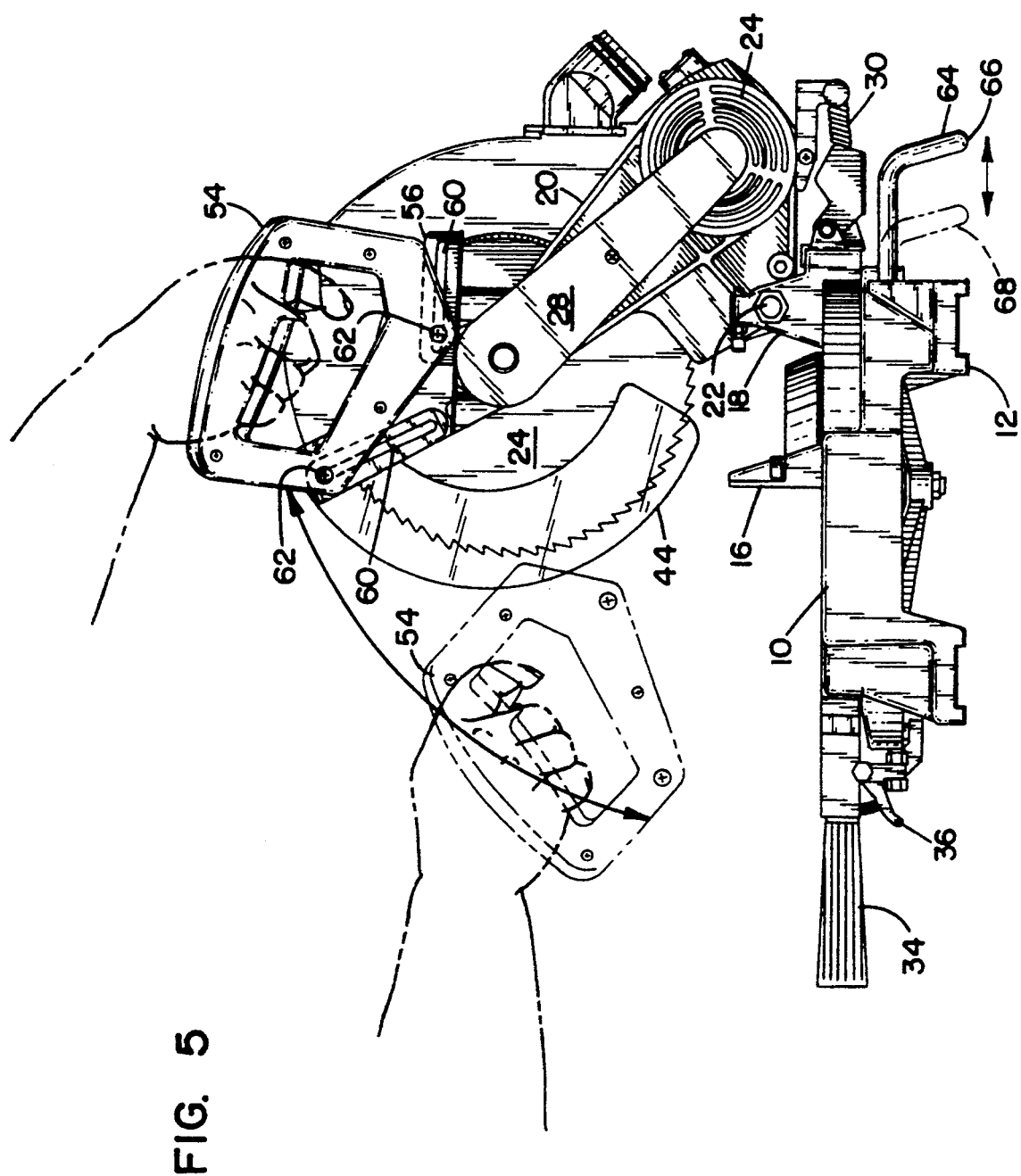
FIGS. 5 and 6 illustrate right side elevational views of a motorized miter box.

The cuttinghead handle 54 for guiding the movement of saw 24 between the raised, rest position and the lowered, operational position is adjustably coupled to the cuttinghead apparatus so that the orientation of the cuttinghead handle with respect to a user of the saw can be adjusted by the user between a first position and a second position. In the first position, which is illustrated in FIG. 5, cuttinghead handle 54 has a preferred orientation for the user when the miter box is located on a floor or at a similar elevation and the user is kneeling or similarly located at floor level. In the second position, illustrated in FIG. 6, cuttinghead handle 54 has a preferred orientation for the user when the saw is located on a bench or similar elevated structure and the user is standing or similarly located in front of the saw.

In the preferred embodiment, the cuttinghead handle apparatus comprises means for adjusting the cuttinghead handle in an infinite number of positions between the first and second positions illustrated. In the embodiment shown, the apparatus for adjusting the cuttinghead handle in an infinite number of positions between the first and second positions comprises a bracket 56 located between cuttinghead handle 54 and the saw apparatus. In the embodiment shown, bracket 56 is shown attached to arm 20 via fasteners 98.

Figure 6:
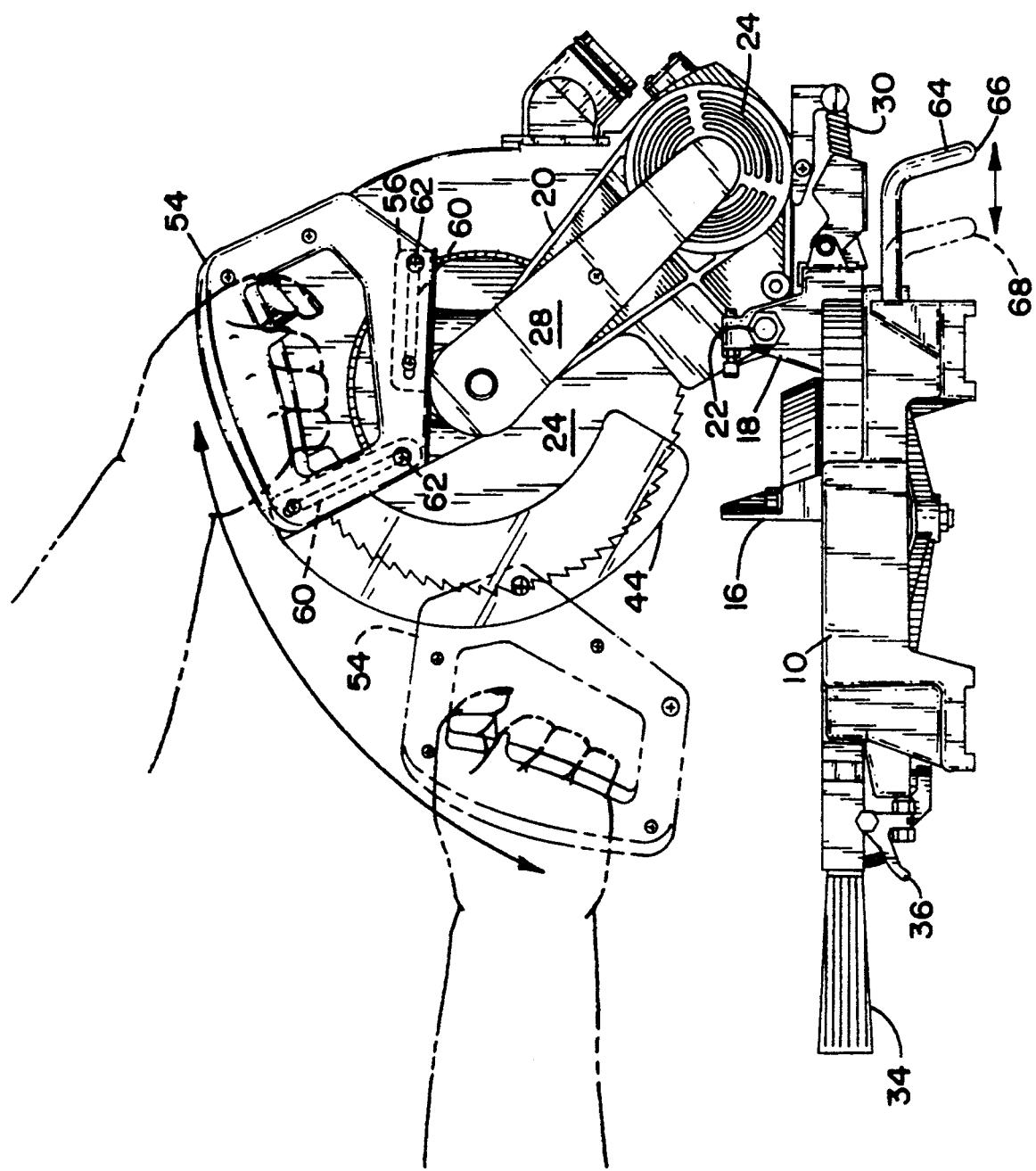

Referring now to FIGS. 5 and 6, in the embodiment shown, bracket 56 defines two elongated adjustments slots 60 through which adjustably secured fasteners 62 hold bracket 56 to cuttinghead handle 54. Slots 60 are oriented so that, when adjustably secured fasteners 62 are loosened, cuttinghead handle 54 can be adjusted to an infinite number of positions between the first and second positions shown in the figures and so that, when adjustably secured fasteners 62 are tightened, cuttinghead handle 54 is fixed in a position selected by the user.

Still referring to FIGS. 5 and 6, the present motorized miter box may be seen to comprise a carrying handle 64 for use by a user in carrying the miter box between work sites. As can be seen from the figures, carrying handle 64 protrudes from the rear of base 10. Carrying handle 64 comprises a support surface 66 located in the same geometric plane as the lower surface 12 of base 10 so that the carrying handle helps prevent the miter box saw from tipping backward if the cuttinghead apparatus is allowed to move freely from its lowered, operational position to its upper, at rest position.

In the preferred embodiment, carrying handle 64 comprises means for adjusting the lateral position of the carrying handle between a storage position in which the most rearward portion of the carrying handle is located in relatively close proximity to base 10 and its second carrying and anti-tipping position in which the most rearward position of the carrying handle is located relatively farther away from the base. In the embodiment shown, carrying handle 64 is formed of rod stock, shaped as desired with two handle extensions 68 which slidably fit through apertures defined by base 10. Handle 64 is prevented from pulling completely out of base 10 via pins 70.

The present inventions are to be limited only in accordance with the scope of the appended claims, since others skilled in the art may devise other embodiments still within the limits of the claims.

What is claimed is:

1. A motorized miter box, comprising:
   (a) a base;
   (b) a turntable rotatably supported by the base;
   (c) a fence disposed above the base for supporting the orientation of a workpiece located at the base;
   (d) a support coupled to the turntable at a rear portion of the turntable;
   (e) cuttinghead means comprising a motor driving a saw blade for cutting the workpiece, the cuttinghead means being pivotally coupled to the support for positioning the saw blade between a raised, rest position and a lowered, operational position;
   (f) cuttinghead handle means comprising a cuttinghead handle having a switch electrically coupled to the motor, the cuttinghead handle being configured for guiding the movement of the saw blade between the raised, rest position and the lowered, operational position, the cuttinghead handle means comprising adjustable coupling means for adjustably coupling the cuttinghead handle to the housing of the cuttinghead means so that the orientation of the cuttinghead handle with respect to a user of the motorized miter box can be selectively adjusted by the user over a range of positions between a first position and a second position.

2. The motorized miter box of claim 1 wherein the adjustable coupling means comprises a positioning mechanism for enabling:
   (a) the cuttinghead handle to be positioned proximate the first position, such position having a preferred orientation for the user when the miter box is located on a floor or at a similar elevation and the user is kneeling or similarly located at floor level; and
   (b) the cuttinghead handle to be positioned proximate the second position, such position having a preferred orientation for the user when the saw is located on a bench or similar elevated structure and the user is standing or similarly located in front of the saw.

3. The motorized miter box of claim 1 wherein the adjustable coupling means comprises means for rotating the cuttinghead handle with respect to the cuttinghead means about a virtual center of rotation which moves as the cuttinghead handle is rotated.

4. The miter box of claim 1 wherein the cuttinghead handle means comprises means for adjusting the cuttinghead handle in a plurality of positions between the first and second positions.

5. The miter box of claim 1 wherein the cuttinghead handle means comprises means for adjusting the cuttinghead handle in an infinite number of positions between the first and second positions.

6. The miter box of claim 5 wherein the means for adjusting the cuttinghead handle in an infinite number of positions between the first and second positions comprises a bracket located between the cuttinghead handle and the cuttinghead means, the bracket defining an elongated adjustment slot through which adjustably secured fasteners hold the bracket between the cuttinghead handle and the cuttinghead means, the slot being oriented so that, when the adjustably secured fasteners are loosened, the cuttinghead handle can be adjusted to an infinite number of positions between the first and second positions and so that, when the adjustably secured fasteners are tightened, the cuttinghead handle is fixed in a position selected by the user.

7. The miter box saw of claim 6 wherein bracket defines a plurality of elongated adjustment slots through which adjustably secured fasteners hold the bracket between the cuttinghead handle and the cuttinghead means, the slots being oriented so that, when the adjustably secured fasteners are loosened, the cuttinghead handle can be adjusted to an infinite number of positions between the first and second positions and so that, when the adjustably secured fasteners are tightened, the cuttinghead handle is fixed in a position selected by the user.

8. The miter box saw of claim 6 wherein bracket defines two elongated adjustment slots through which adjustably secured fasteners hold the bracket between the cuttinghead handle and the cuttinghead means, the slots being oriented so that, when the adjustably secured fasteners are loosened, the cuttinghead handle can be adjusted to an infinite number of positions between the first and second positions and so that, when the adjustably secured fasteners are tightened, the cuttinghead handle is fixed in a position selected by the user.

9. A motorized miter box, comprising:
(a) a base having a lower surface for supporting the base on a work surface;
(b) a turntable rotatably supported by the base;
(c) a fence disposed above the base for supporting the orientation of a workpiece located on the base;
(d) a support coupled to the turntable at a rear portion of the turntable;
(e) cuttinghead means for cutting the workpiece, the cuttinghead means being pivotally coupled to the support for positioning a motor driven saw between a raised, rest position and a lowered, operational position, the cuttinghead means comprising biasing means for biasing the motor driven saw to the raised, rest position;
(f) cuttinghead handle means comprising a cuttinghead handle for guiding the movement of the saw between the raised, rest position and the lowered, operational position; and
(g) carrying handle means comprising a carrying handle for use by a user in carrying the miter box between work sites, the carrying handle protruding from the rear of the base, the carrying handle comprising a support surface located in the same geometric plane as the lower surface of the base so that the carrying handle helps prevent the miter box saw from tipping backwards if the cuttinghead means is allowed to move freely from its lowered, operational position to its upper, at rest position.

10. The miter box of claim 9 wherein the carrying handle means comprises means for adjusting the lateral position of the carrying handle between a storage position in which the most rearward portion of the carrying handle is located in relatively close proximity to the base and a second carrying and anti-tipping position in which the most rearward portion of the carrying handle is located relatively further away from the base.

11. The power miter box of claim 9 wherein the means for adjusting the lateral position of the carrying handle comprises means for adjusting the position of the carrying handle in a plurality of positions between a storage position in which the most rearward portion of the carrying handle is located in relatively close proximity to the base and a second carrying and anti-tipping position in which the most rearward portion of the carrying handle is located relatively further away from the base.

12. The power miter box of claim 11 wherein the means for adjusting the lateral position of the carrying handle comprises means for adjusting the position of the carrying handle in an infinite number of positions between a storage position in which the most rearward portion of the carrying handle is located in relatively close proximity to the base and a second carrying and anti-tipping position in which the most rearward portion of the carrying handle is located relatively further away from the base.

13. A motorized miter box, comprising:
(a) a base having a lower surface for supporting the base on a work surface;
(b) a turntable rotatably supported by the base;
(c) a fence disposed above the base for supporting the orientation of a workpiece located on the base;
(d) a support coupled to the turntable at a rear portion of the turntable;
(e) cuttinghead means for cutting the workpiece, the cuttinghead means being pivotally coupled to the support for positioning a motor driven saw between a raised, rest position and a lowered, operational position;
(f) cuttinghead handle means comprising a cuttinghead handle for guiding the movement of the saw between the raised, rest position and the lowered, operational position, the cuttinghead handle being adjustably coupled to the cuttinghead means so that the orientation of the cuttinghead handle with respect to a user of the saw can be selectively adjusted by the user between a first position and a second position; and
(g) carrying handle means comprising a carrying handle for use by a user in carrying the miter box between work sites, the carrying handle protruding from the rear of the base, the carrying handle comprising a support surface located in the same geometric plane as the lower surface of the base so that the carrying handle helps prevent the miter box saw from tipping backwards if the cuttinghead means is allowed to move freely from its lowered, carrying and anti-tipping position to its upper, at rest position.

14. The miter box of claim 13 wherein the cuttinghead handle means comprises means for adjusting the cuttinghead handle in a plurality of positions between the first and second positions.

15. The miter box of claim 13 wherein the cuttinghead handle means comprises means for adjusting the cuttinghead handle in an infinite number of positions between the first and second positions.

16. The miter box of claim 15 wherein the means for adjusting the cuttinghead handle in an infinite number of positions between the first and second positions comprises a bracket located between the cuttinghead handle and the cuttinghead means, the bracket defining an elongated adjustment slot through which adjustably secured fasteners hold the bracket between the cuttinghead handle and the cuttinghead means, the slot being oriented so that, when the adjustably secured fasteners are loosened, the cuttinghead handle can be adjusted to an infinite number of positions between the first and second positions and so that, when the adjustably secured fasteners are tightened, the cuttinghead handle is fixed in a position selected by the user.

17. The miter box saw of claim 15 wherein bracket defines a plurality of elongated adjustment slots through which adjustably secured fasteners hold the bracket between the cuttinghead handle and the cuttinghead means, the slots being oriented so that, when the adjustably secured fasteners are loosened, the cuttinghead handle can be adjusted to an infinite number of positions between the first and second positions and so that, when the adjustably secured fasteners are tightened, the cuttinghead handle is fixed in a position selected by the user.

18. The miter box saw of claim 15 wherein bracket defines two elongated adjustment slots through which adjustably secured fasteners hold the bracket between the cuttinghead handle and the cuttinghead means, the slots being oriented so that, when the adjustably secured fasteners are loosened, the cuttinghead handle can be adjusted to an infinite number of positions between the first and second positions and so that, when the adjustably secured fasteners are tightened, the cuttinghead handle is fixed in a position selected by the user.

19. The miter box of claim 13 wherein the carrying handle means comprises means for adjusting the lateral position of the carrying handle between a storage position in which the most rearward portion of the carrying handle is located in relatively close proximity to the base and a second carrying and anti-tipping position in which the carrying handle is located relatively further away from the base.

20. The power miter box of claim 19 wherein the means for adjusting the lateral position of the carrying handle comprises means for adjusting the position of the carrying handle in a plurality of positions between a storage position in which the most rearward portion of the carrying handle is located in relatively close proximity to the base and a second carrying and anti-tipping position in which the carrying handle is located relatively further away from the base.

21. The power miter box of claim 19 wherein the means for adjusting the lateral position of the carrying handle comprises means for adjusting the position of the carrying handle in an infinite number of positions between a storage position in which the most rearward portion of the carrying handle is located in relatively close proximity to the base and a second carrying and anti-tipping position in which the carrying handle is located relatively further away from the base.

22. The motorized miter box of claim 11 wherein the adjustable coupling means comprises a positioning mechanism for enabling:

(a) the cuttinghead handle to be positioned proximate the first position, such position having a preferred orientation for the user when the miter box is located on a floor or at a similar elevation and the user is kneeling or similarly located at floor level; and (b) the cuttinghead handle to be positioned proximate the second position, such position having a preferred orientation for the user when the saw is located on a bench or similar elevated structure and the user is standing or similarly located in front of the saw.

* * * * *